(12) United States Patent
Hannet (10) Patent No.: US 10,890,248 B2
(45) Date of Patent: Jan. 12, 2021

(54) PLANETARY GEARBOX HAVING A RING GEAR ACCOMMODATED IN A HOUSING PART

(71) Applicant: SEW-EURODRIVE GMBH & CO. KG, Bruchsal (DE)

(72) Inventor: Stefan Hannet, Schwetzingen (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 0 days.

(21) Appl. No.: 16/349,356

(22) PCT Filed: Oct. 25, 2017

(86) PCT No.: PCT/EP2017/025318
§ 371 (c)(1),
(2) Date: May 13, 2019

(87) PCT Pub. No.: WO2018/086757
PCT Pub. Date: May 17, 2018

(65) Prior Publication Data
US 2019/0360579 A1 Nov. 28, 2019

(30) Foreign Application Priority Data
Nov. 11, 2016 (DE) .................. 10 2016 013 395

(51) Int. Cl.
*F16H 1/28* (2006.01)
*F16H 57/08* (2006.01)
*F16H 55/17* (2006.01)
(52) U.S. Cl.
CPC ........... *F16H 57/08* (2013.01); *F16H 1/2818* (2013.01); *F16H 2001/289* (2013.01); *F16H 2055/176* (2013.01)

(58) Field of Classification Search
None
See application file for complete search history.

(56) References Cited

U.S. PATENT DOCUMENTS

| 2,547,263 A | 4/1951 | Heimann et al. |
| 2,831,716 A | 4/1958 | Wurzel |

(Continued)

FOREIGN PATENT DOCUMENTS

| DE | 837341 B | 4/1952 |
| DE | 1922273 U | 8/1965 |

(Continued)

OTHER PUBLICATIONS

International Search Report dated Jan. 23, 2018, in International Application No. PCT/EP2017/025318 (English-language translation).

(Continued)

*Primary Examiner* — Justin Holmes
(74) *Attorney, Agent, or Firm* — Carter Deluca & Farrell LLP (57) ABSTRACT

A planetary gearbox includes a ring gear accommodated in a housing part, the ring gear particularly has on its radially outer surface, in particular its radially outer side, an annular groove, the annular groove, in particular a circumferential annular groove in the circumferential direction, and a spring element is accommodated in the annular groove, which projects at least partially into an annular groove introduced into the housing part.

21 Claims, 8 Drawing Sheets

(56) References Cited

U.S. PATENT DOCUMENTS

| | | | | |
|---|---|---|---|---|
| 3,289,488 | A | | 12/1966 | Breuer |
| 3,460,427 | A | * | 8/1969 | Baumgarten ........... F16B 21/18 |
| | | | | 411/518 |
| 3,922,932 | A | | 12/1975 | Maurice |
| 4,583,413 | A | * | 4/1986 | Lack ..................... F16H 1/2809 |
| | | | | 475/159 |
| 6,117,036 | A | * | 9/2000 | Lanzon ................ B60K 17/344 |
| | | | | 475/204 |
| 8,905,698 | B2 | * | 12/2014 | Tubridy ................ E21B 17/023 |
| | | | | 411/517 |
| 2004/0045389 | A1 | * | 3/2004 | Pascoe ................... F16H 55/17 |
| | | | | 74/434 |
| 2013/0345009 | A1 | | 12/2013 | Iwasa |

FOREIGN PATENT DOCUMENTS

| | | |
|---|---|---|
| DE | 2310288 A1 | 6/1974 |
| DE | 102015202161 A1 | 8/2016 |
| EP | 0239556 A1 | 9/1987 |
| GB | 770659 A | 3/1957 |

OTHER PUBLICATIONS

International Preliminary Report on Patentability issued from the International Bureau dated May 23, 2019.

\* cited by examiner

PLANETARY GEARBOX HAVING A RING GEAR ACCOMMODATED IN A HOUSING PART

FIELD OF THE INVENTION

The present invention relates to a planetary gearbox having a ring gear accommodated in a housing part.

BACKGROUND INFORMATION

It is generally conventional that planetary gearboxes include a ring gear.

German Published Patent Application No. 10 2015 202 161 describes a connection system.

European Published Patent Application No. 0 239 556 describes a coupling between two elements.

U.K. Published Patent Application No. 770 659 describes an improvement relating to annular stops.

U.S. Pat. No. 2,831,716 describes a releasable coupling.

German Published Utility Model Application No. 19 22 273 describes a snap ring.

German Published Patent Application No. 837 341 describes a device for securing a component on a shaft against an axial displacement.

U.S. Patent Application Publication No. 2013/0345009 describes a drive device for a vehicle.

SUMMARY

Example embodiments of the present invention provide for simplifying the manufacture of a planetary gearbox.

According to an example embodiment of the present invention, a planetary gearbox includes a ring gear, which is accommodated in a housing part, and the ring gear has an annular groove, in particular an annular groove extending in a circumferential direction, on its radially outer surface, in particular the radial outer side, a spring element being accommodated in the annular groove, which at least partially projects into an annular groove introduced into the housing part.

This is considered advantageous insofar as the spring element is pressed into the annular groove when the ring gear is inserted into the receiving opening of the housing part and radially expands once it reaches the annular groove of the housing part. Toward this end, the spring element has a conical configuration, the tip of the cone pointing in the insertion direction. Using the relaxed, i.e. radially expanded, spring element, a keyed connection is obtained since the spring element projects at least partially into both annular grooves.

According to example embodiments, the spring element is arranged in an annular shape, and/or the spring element is arranged as an apertured disk. This has the advantage of allowing for a simple production, in particular as a punched and bent component.

According to example embodiments, the smallest radial clearance value of the apertured disk at a respective axial position increases monotonically in the axial direction, and the greatest radial clearance value of the apertured disk at a respective axial position increases monotonically in the axial direction. This is considered advantageous insofar as the spring element is preloaded counter to the axial direction, without stopping, when the spring element is inserted into the housing part together with the ring gear.

According to example embodiments, the smallest radial clearance value of the apertured disk at a respective axial position increases monotonically counter to the axial direction, and the greatest radial clearance value of the apertured disk at a respective axial position increases monotonically counter to the axial direction. This has the advantage of making it easy to provide a constant wall thickness.

According to example embodiments, the spring element has a constant wall thickness. This is considered advantageous insofar as it allows for a simple production using steel plate.

According to example embodiments, the spring element is a punched and bent component, in particular a punched and bent component made of steel sheet. This has the advantage of simplifying the production.

According to example embodiments, the spring element has a radially uninterrupted slot at a circumferential position and/or the spring element has a respective radially uninterrupted slot at at least two circumferential positions. This offers the advantage that a more elastic configuration is achievable.

According to example embodiments, the spring element is axially preloaded, so that the ring gear and the housing part are axially pushed apart, in particular such that bearings, which support a planet gear carrier and are accommodated in the housing part, are pressed against a step formed in the housing part and are preloaded. This has the advantage that the housing part exerts pressure on the ring gear, especially counter to the axial direction, with the aid of the spring element, and is thereby pressed onto one of the bearings, which exerts pressure on a second bearing, which is pressed against the step and preloaded as a result.

According to example embodiments, the annular groove introduced into the housing part has a chamfer at its first axial end region, in particular for the purpose of introducing the spring element into the annular groove developed on the housing part. This has the advantage that the chamfer allows the spring element to be easily inserted into the annular groove of the housing part. In other words, the chamfer guides the spring element into the annular groove when the spring element relaxes.

According to example embodiments, the annular groove introduced into the housing part has a groove wall which includes a planar region, the normal direction of the planar region with respect to the axial direction having a non-zero angle, in particular an angle between 20° and 70°. This offers the advantage of allowing for a defined guidance when the spring element is relaxed.

According to example embodiments, the spring element has a toothed or knurled configuration at its radially inner circumference and/or outer circumference, the teeth of the tooth system in particular being spaced apart from one another at regular intervals in the circumferential direction. This is considered advantageous insofar as it allows for better securing of the spring element against a rotation in the circumferential direction.

According to example embodiments, the spring element is braced at the bottom of the annular groove introduced into the ring gear on the one hand, and at the chamfer of the annular groove introduced into the housing part on the other hand. This has the advantage of allowing for stable bracing in the edge region of the annular groove.

According to example embodiments, the planet gear carrier accommodates planet pins, on which a planet gear is situated which is rotatably mounted with the aid of the respective bearing, the tooth system of the respective planet gear meshing with the inner tooth system of the ring gear and meshing with the tooth system of a sun gear that is rotatably supported relative to the housing part on the other hand, the sun gear in particular being situated coaxially with respect to the planet gear carrier. This offers the advantage that a planetary gearbox is able to be produced in a simple manner.

Further features and aspects of example embodiments of the present invention are described in greater detail below with reference to the appended Figures.

DETAILED DESCRIPTION

Figure 1:
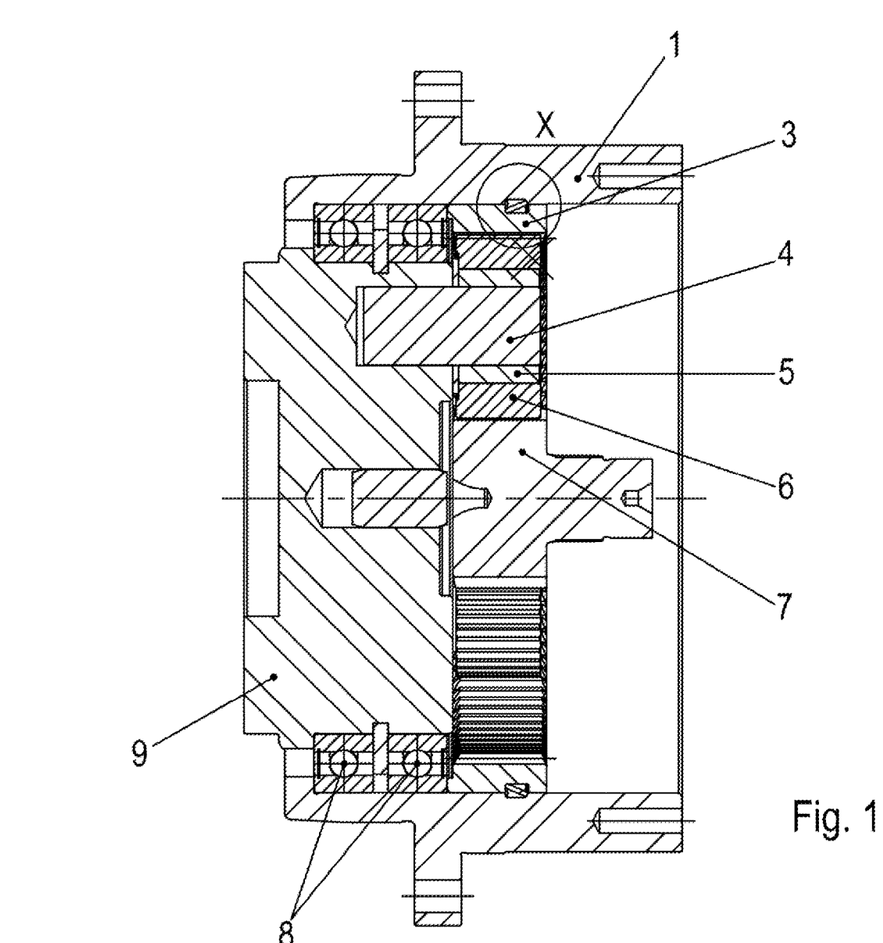
FIG. 1 shows a cross-section through a planetary gearbox according to an example embodiment of the present invention, ring gear 3 being connected to a housing part 1 of the planetary gearbox by a keyed connection with the aid of a spring element 2.

As illustrated in FIG. 1, the planetary gearbox includes a ring gear 3 having an internal tooth system, which is situated in a housing part 1 of the planetary gearbox by a keyed connection.

The tooth systems of planet gears 6 mesh with the internal tooth system of ring gear 3.

Via bearings 5, in particular needle bearings, planet gears 6 are rotatably mounted on planet gear axles, which are pressed into a planet gear carrier 9.

Planet gear carrier 9 is rotatably mounted in housing part 1 with the aid of two bearings 8.

The tooth systems of planet gears 6 also mesh with the tooth system of a sun gear 7, which is also rotatably mounted, in particular relative to housing part 1.

The axis of rotation of planet gear carrier 9 and the axis of rotation of sun gear 7 are aligned coaxially to each other.

A circumferential annular groove is introduced at the outer circumference of ring gear 3; in the same manner, an annular groove is introduced into the inner side of housing part 1.

Figure 2:
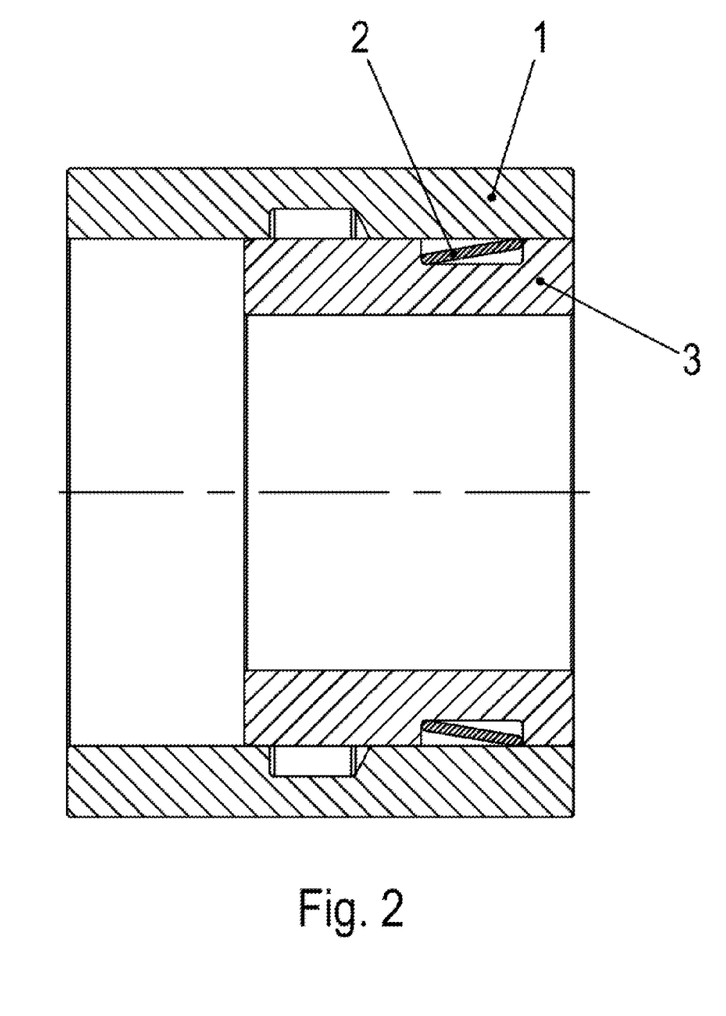
FIG. 2 shows ring gear 3 prior to the keyed connection with the aid of spring element 2.
Figure 3:
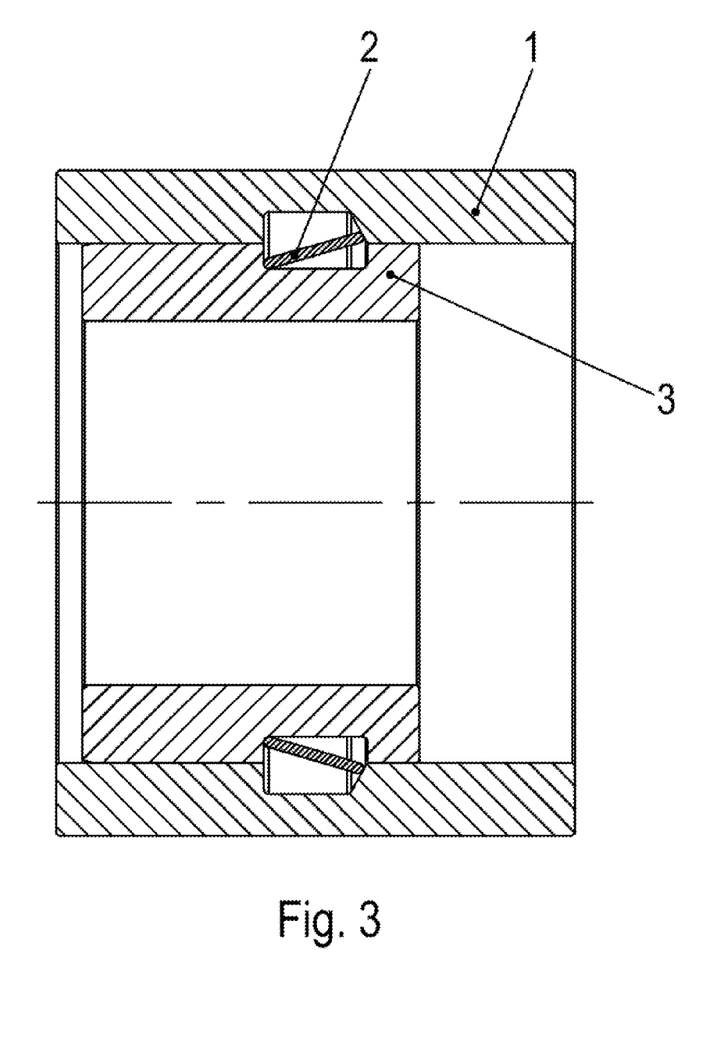
FIG. 3 illustrates the start of the snap-in process of spring element 2 into an annular groove of housing part 1, spring element 2 sliding along a chamfer of the annular groove.
Figure 4:
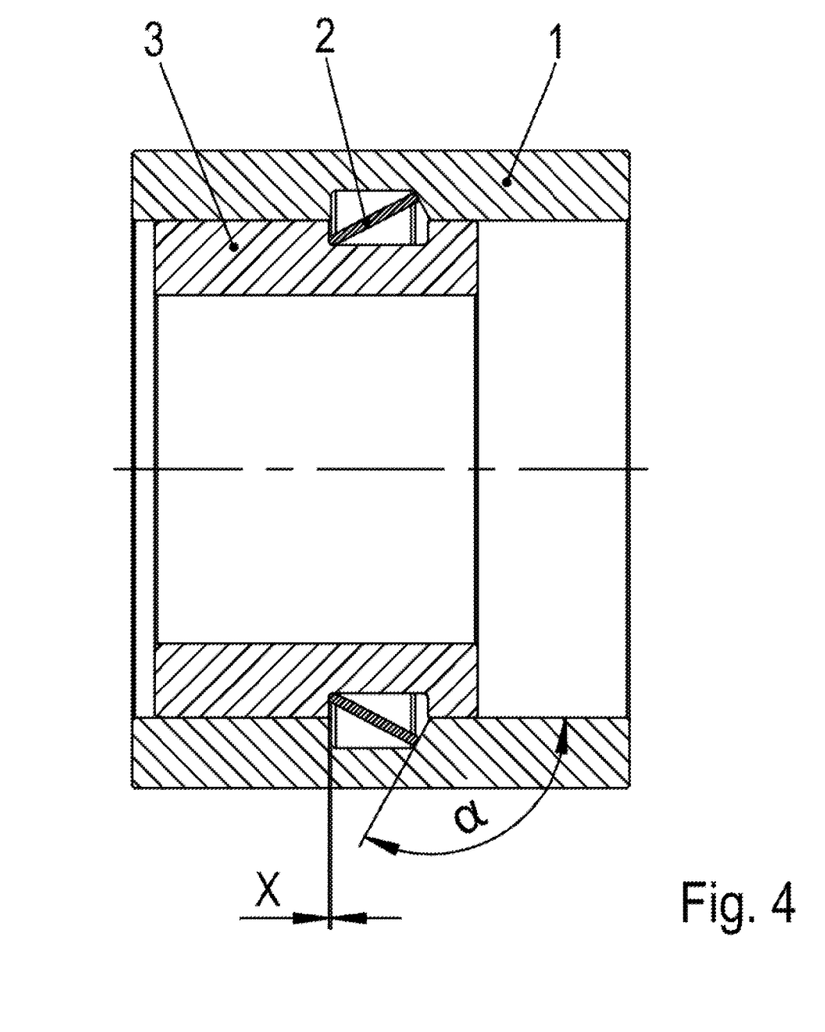
In FIG. 4, spring element 2 is shown snapped into the annular groove of the housing part.
Figure 5:
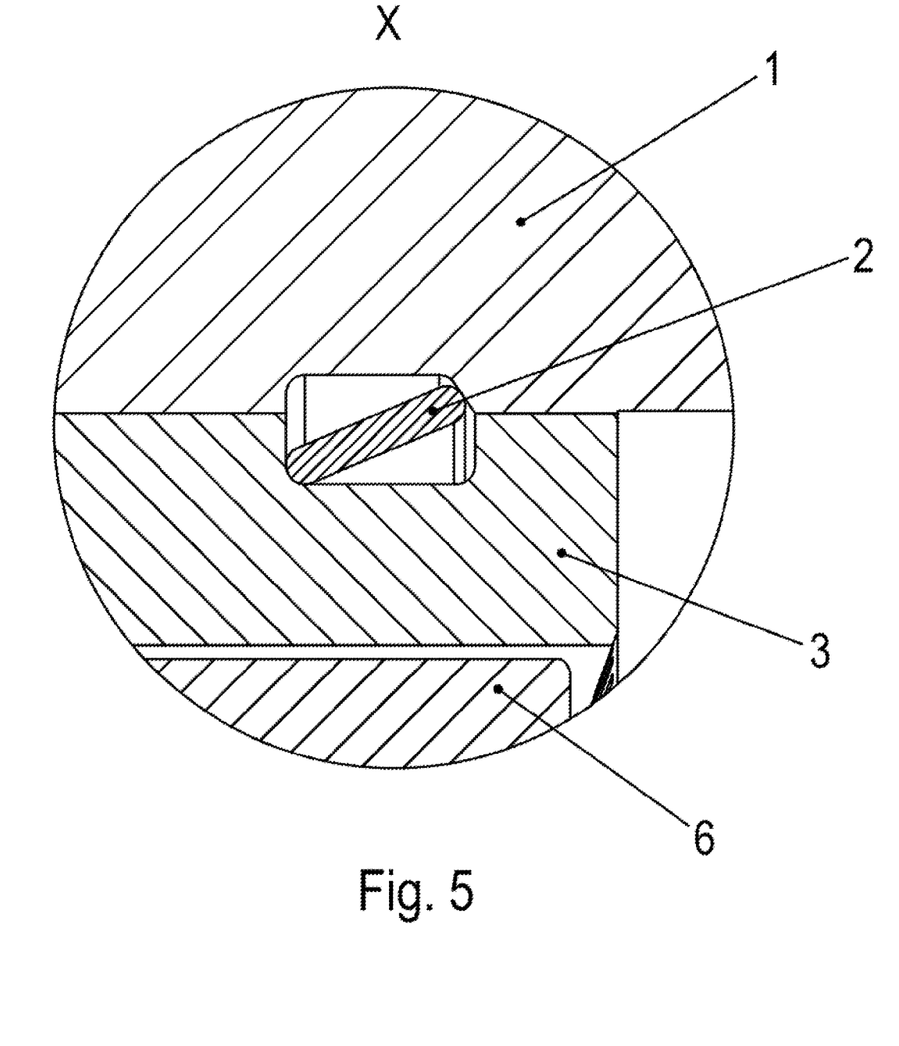
FIG. 5 shows an enlarged view of FIG. 1.

As illustrated in FIGS. 2 through 4, spring element 2 is placed into the annular groove of ring gear 3 during the assembly and is elastically deformed when slipped into the bore hole provided to accommodate ring gear 3 in housing part 1, such that it is fully situated in the annular groove of the ring gear.

At its one axial edge region, the annular groove introduced into housing part 1 has a chamfer, i.e. a circumferential bevel in the circumferential direction.

As soon as this chamfer reaches the axial region of the annular groove of housing part 1 when ring gear 3 is inserted into housing part 1, spring element 2 begins to relax and gradually slides along the chamfer into the annular groove of housing part 1 via its first axial end region.

In the relaxed state, the radial clearance region covered by spring element 2 in relation to the axis of rotation of planet gear carrier 9 overlaps both with the radial clearance region covered by ring gear 3 and the radial clearance region covered by housing part 1, in particular in the axial region covered by spring element 2.

Spring element 2 may be axially preloaded so that ring gear 3 and housing part 1 are axially pushed apart. Spring element 2 therefore generates a spring force that exerts pressure on the ring gear counter to the axial direction and on the housing part in an axial direction.

Figure 6:
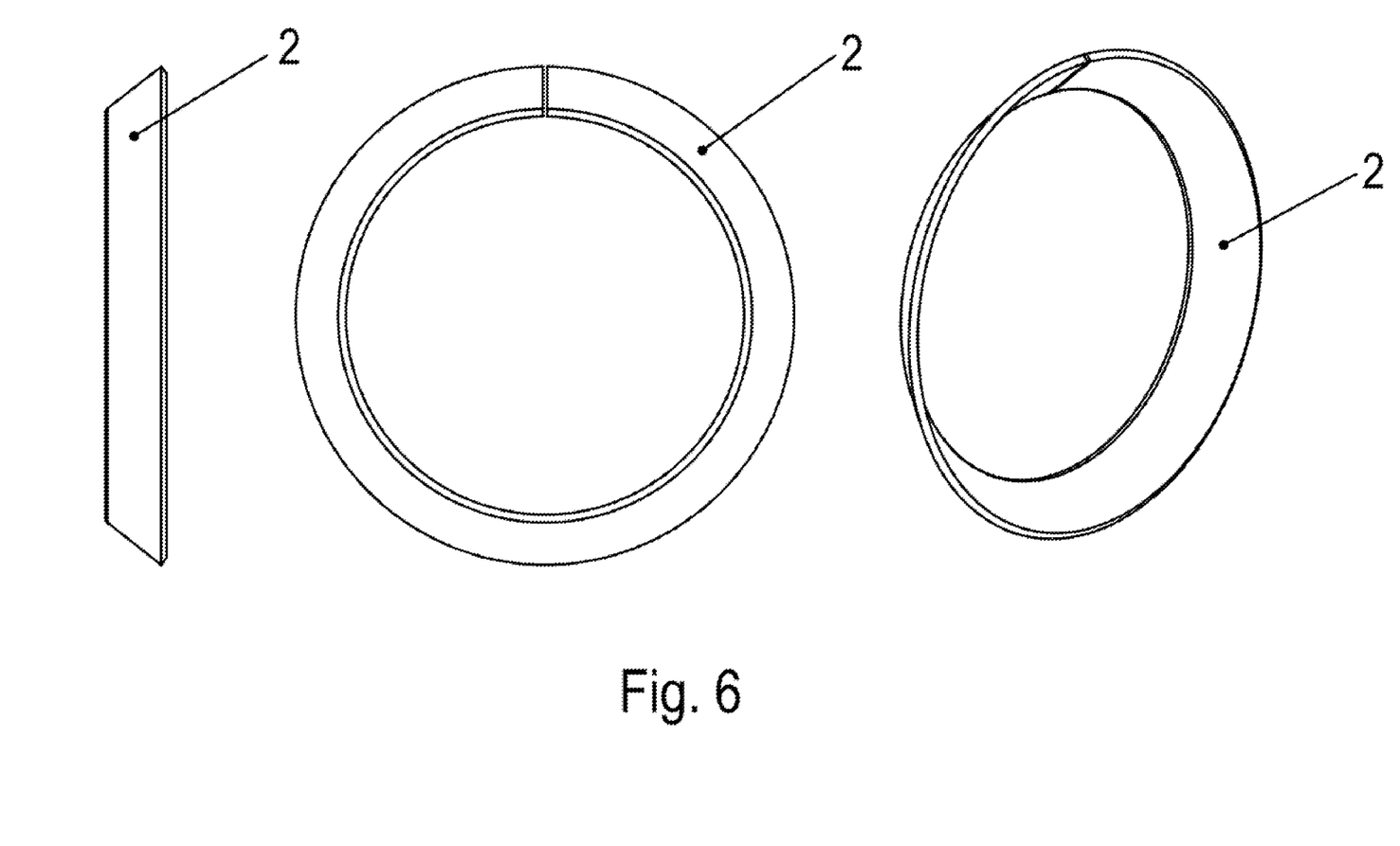
In FIG. 6, spring element 2 is shown in a side view, in a plan view and in an oblique view.

As illustrated in FIG. 6, spring element 2 is arranged as an apertured disk, i.e. in the form of a ring.

The ring axis of the apertured disk is arranged coaxially to the axis of rotation of planet gear carrier 9.

The inner diameter of the apertured disk corresponds to the smallest diameter of the annular groove introduced into ring gear 3. As a result, the inner edge of the apertured disk rests against the bottom of the annular groove introduced into ring gear 3.

After the outer edge of the apertured disk has been pressed along the chamfer into the annular groove introduced into the housing part during the production while the spring element, i.e. the aperture disk, is relaxed, the outer edge of the aperture disk rests against the groove bottom of the annular groove introduced into housing part 1.

Starting from the inner edge of the apertured disk towards the outer edge of the apertured disk, the radial region covered by the apertured disk increases monotonically as a function of the associated axial region covered by the apertured disk.

The apertured disk may have a constant wall thickness.

The radial clearance region covered by the apertured disk at a respective axial position monotonically shifts to greater radial clearances in the axial direction as a function of an increasing axial position. In other words, the smallest radial clearance value of the apertured disk at a respective axial position monotonically increases in the axial direction and the greatest radial clearance value of the apertured disk at a respective axial position monotonically increases in the axial direction.

The radially outer circumference of the apertured disk may correspond to a frustoconical surface, and the radially inner circumference of the apertured disk corresponds to a frustoconical surface as well.

This makes spring element 2, which is arranged as a punched and bent component from sheet metal, in particular steel sheet, easily deformable.

As illustrated in FIG. 6, spring element 2 has a radially uninterrupted slot at a circumferential position for an easier deformation. The deformability may thus take place in a defined manner.

Figure 7:
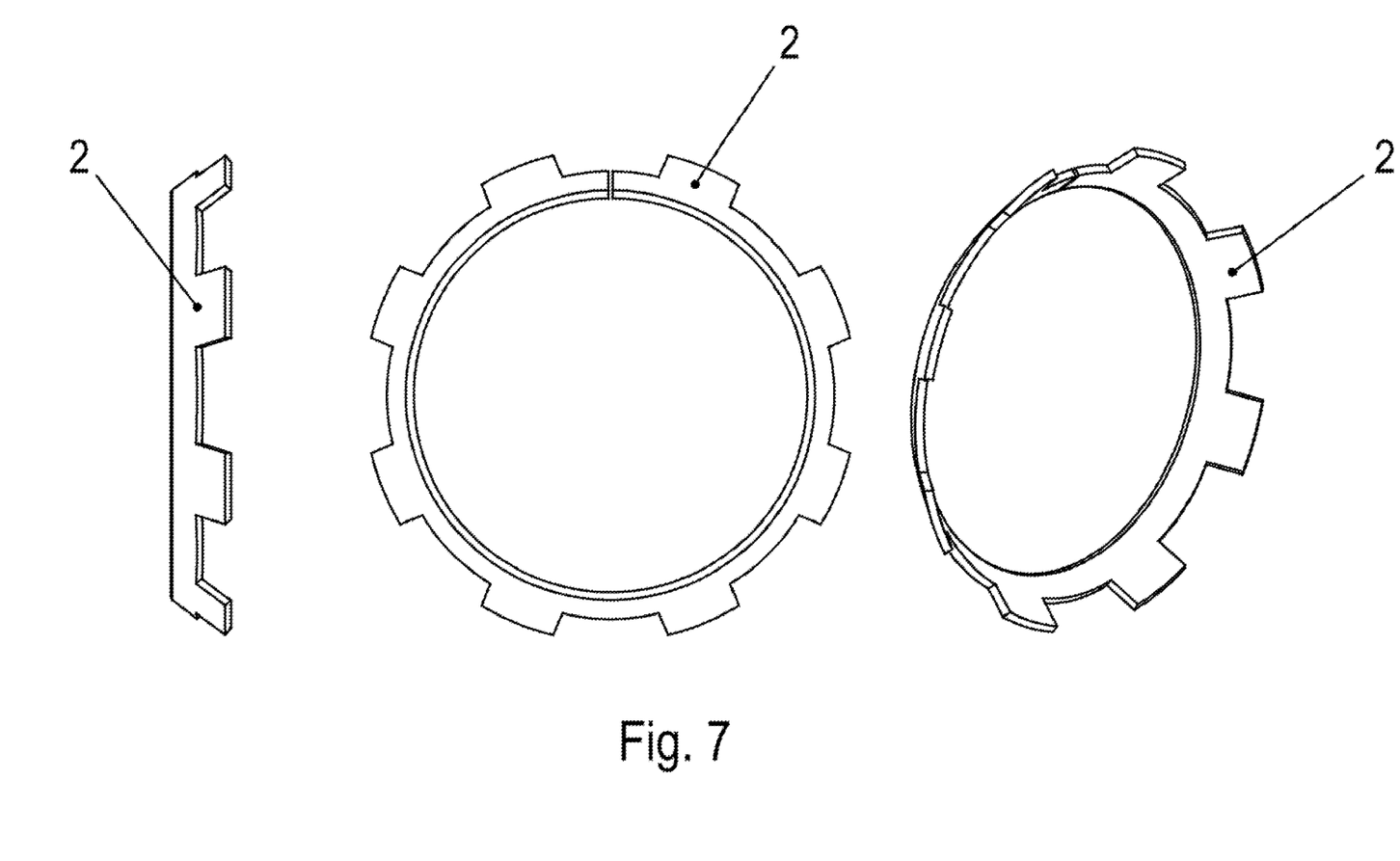
In FIG. 7, another spring element 2 is shown in a side view, a plan view and in an oblique view.

As illustrated in FIG. 7, instead of the previously described spring element 2, it is also possible to use a spring element 2 that has a toothed or notched configuration at its radially outer edge, which again resembles an apertured disk in all other respects. The elevated areas of this tooth system are set apart from one another at regular intervals in the circumferential direction and have a rectangular shape in the circumferential direction.

Figure 8:
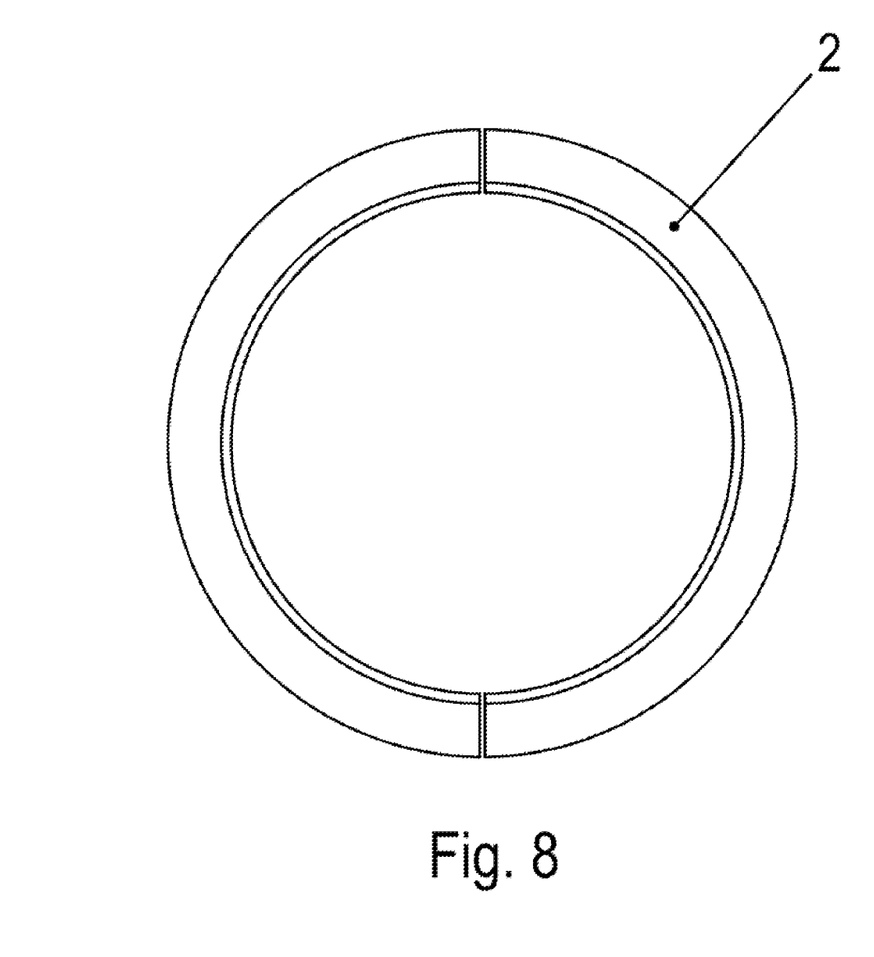
FIG. 8 shows a further spring element 2 in a plan view.

As illustrated in FIG. 8, spring element 2 may also have a slot, in particular a radially uninterrupted slot, at more than one circumferential position. Even better elastic deformability is thereby achievable. This additional slot may be used in the example embodiments described herein.

Spring element 2 may be circular at its axially frontal region and may also be circular at its axially rear region.

LIST OF REFERENCE NUMERALS 1 housing part
2 spring element 3 ring gear, in particular ring gear having an internal tooth system
4 planet gear carrier
5 bearing, in particular needle bearing
6 planet gear
7 sun gear
8 bearing
9 planet gear carrier

The invention claimed is:

1. A planetary gearbox, comprising:
a housing part;
a ring gear accommodated in the housing part; and
a spring device;
wherein a radially outer surface and/or a radially outer side of the ring gear includes an annular groove, the spring element being accommodated in the annular groove and at least partially projecting into an annular groove in the housing part.

2. The planetary gearbox according to claim 1, wherein the annular groove is arranged as a circumferential annular groove in a circumferential direction.

3. The planetary gearbox according to claim 1, wherein the spring device is arranged as a ring and/or an apertured disk.

4. The planetary gearbox according to claim 1, wherein the spring device is circular in an axially frontal region and an axially rear region.

5. The planetary gearbox according to claim 1, wherein the spring device is arranged as an apertured disk, a smallest radial clearance value of the apertured disk at a respective axial position increases monotonically in an axial direction, and a greatest radial clearance value of the apertured disk at a respective axial position monotonically increases in the axial direction.

6. The planetary gearbox according to claim 1, wherein the spring device is arranged as an apertured disk, a smallest radial clearance value of the apertured disk at a respective axial position monotonically increases counter to an axial direction, and a greatest radial clearance value of the apertured disk at a respective axial position monotonically increases counter to the axial direction.

7. The planetary gearbox according to claim 1, wherein the spring device has a constant wall thickness.

8. The planetary gearbox according to claim 1, wherein the spring device is arranged as a punched and bent component.

9. The planetary gearbox according to claim 8, wherein the spring device is arranged as a punched and bent component produced from steel sheet.

10. The planetary gearbox according to claim 1, wherein the spring device includes a radially uninterrupted slot at a circumferential position.

11. The planetary gearbox according to claim 1, wherein the spring device includes a radially uninterrupted slot at a plurality of circumferential positions.

12. The planetary gearbox according to claim 1, wherein the spring device is axially preloaded so that the ring gear and the housing part are axially pushed apart.

13. The planetary gearbox according to claim 1, wherein the spring device is axially preload so that the ring gear and the housing part are axially pushed apart and such that bearings, supporting a planet gear carrier and accommodated in the housing part, are pressed against a step provided on the housing part and preloaded.

14. The planetary gearbox according to claim 1, wherein the annular groove of the housing part includes a chamfer at a first axial end region, adapted to receive the spring device.

15. The planetary gearbox according to claim 1, wherein the annular groove in the housing part has a groove wall having a planar region, a normal direction of the planar region having a non-zero angle in relation to the axial direction.

16. The planetary gearbox according to claim 15, wherein the angle is between 20° and 70°.

17. The planetary gearbox according to claim 1, wherein the spring device is a toothed and/or knurled at a radially inner circumference and/or outer circumference.

18. The planetary gearbox according to claim 17, wherein the teeth of the spring device are set apart from one another at regular intervals in a circumferential direction.

19. The planetary gearbox according to claim 1, wherein the spring device is braced at a bottom of the annular groove in the ring gear and on a chamfer of the annular groove in the housing part.

20. The planetary gearbox according to claim 1, wherein planet lugs are provided in a planet gear carrier, a planetary gear being provided on each planet lug and supported by a respective bearing, a tooth system of the planetary gear meshing with an internal tooth system of the ring gear and meshing with a tooth system of a sun gear which is rotatably supported relative to the housing part.

21. The planetary gearbox according to claim 20, wherein the sun gear is arranged coaxially to the planet gear carrier.

* * * * *